United States Patent [19]

Bohrer

[11] Patent Number: 4,566,320

[45] Date of Patent: Jan. 28, 1986

[54] FLUID FLOW SENSING MEANS WITH AMBIENT TEMPERATURE COMPENSATION

[75] Inventor: Philip J. Bohrer, Minneapolis, Minn.

[73] Assignee: Honeywell, Inc., Minneapolis, Minn.

[21] Appl. No.: 607,547

[22] Filed: May 7, 1984

[51] Int. Cl.⁴ .............................................. G01F 1/68
[52] U.S. Cl. ..................................................... 73/204
[58] Field of Search .......................................... 73/204

[56] References Cited

U.S. PATENT DOCUMENTS

| | | | |
|---|---|---|---|
| 2,726,546 | 12/1955 | King, Jr. ................................. | 73/204 |
| 2,947,938 | 8/1960 | Bennett .................................. | 73/204 |
| 3,085,431 | 4/1963 | Yerman et al. ........................ | 73/204 |
| 3,352,154 | 11/1967 | Djorup ................................... | 73/204 |
| 3,429,178 | 2/1969 | Durbin ................................... | 73/204 |
| 3,548,662 | 12/1970 | Brandau et al. . | |
| 3,677,085 | 7/1972 | Hayakawa ............................ | 73/204 |
| 3,995,481 | 12/1976 | Djorup ................................... | 73/189 |
| 4,080,821 | 3/1978 | Johnston . | |
| 4,320,655 | 3/1982 | Kammermaier et al. ............ | 73/204 |
| 4,478,077 | 10/1984 | Bohrer et al. ........................ | 73/204 |

Primary Examiner—Herbert Goldstein
Attorney, Agent, or Firm—Alfred N. Feldman

[57] ABSTRACT

A flow sensing or differential pressure sensing device utilizing a pair of bridges is disclosed. A first bridge operates a heating element and a temperature dependent resistor to in turn control an error integrator. The error feedback provides the voltage for both of the bridges thereby keeping the operation of the bridges compensated for ambient temperature variations.

20 Claims, 2 Drawing Figures

FLUID FLOW SENSING MEANS WITH AMBIENT TEMPERATURE COMPENSATION

BACKGROUND OF THE INVENTION

In recent years flow sensing devices, particularly gas flow sensing devices, have been designed and built by the use of technology comparable to integrated circuit technology. The devices are manufactured into silicon structures and can be manufactured to very small dimensions. Many of these flow sensing devices utilize temperature responsive resistors that are mounted either adjacent to or directly upon the silicon area. As such, integrated circuit technology can be utilized in the fabrication of the necessary electrical circuits for these devices.

Due to their exceedingly small physical dimensions, these devices are capable of responding very rapidly as they have a very small mass. This small mass allows for the thermal changes to occur rapidly. For gas flow sensors based on thermal conductance, flow sensitivity depends on the difference between the ambient gas temperature and the heater temperature. The greater the difference between the heater temperature and the ambient temperature, the larger the signal for a given flow. If the heater utilized in this type of a device is controlled at a constant temperature, an increase in ambient temperature will result in a decrease in the difference between the heater and ambient temperatures.

For differential pressure or flow velocity sensing applications, constant differential temperatures between a heater and ambient results in a sensor response that increases with decreasing ambient temperature. In some applications, this is undesirable, and means should be provided to compensate for the effects of ambient temperature.

SUMMARY OF THE INVENTION

The effects of ambient temperature on mass flow sensors, based on thermal conductance as applied to differential pressure or flow velocity sensing, can be significantly reduced. The invention is a flow sensing means that can be particularly utilized for flow or differential pressure sensing applications. The reduction in temperature dependence can be achieved by controlling the heater temperature with respect to the ambient temperature, wherein the temperature difference between the heater and the ambient increases with increased ambient temperatures. This can be combined with increasing a drive current through the flow responsive resistors that sense temperature when the ambient increases. In the present type of device, a heater is typically flanked by a pair of sensing resistors. If the drive voltage to a bridge which contains these resistors is altered in response to ambient temperature, the temperature dependence of the differential pressure response can be further reduced.

Also, it is possible to alter the invention of the present disclosure by providing for a slight self-heating, by sufficient power dissipation, in the sensing resistor elements. For a given power dissipation, self-heating is greatest at low flows. Higher flows dissipates the power. Self-heating can be designed to have significant effect at no flow and at low flows, with the effect diminishing with increased flow—so at higher flows it has negligible effect. It can thus alter the shape of the response characteristic. In the typical sensor arrangement, the sensor's temperature coefficient of resistance is positive and increasing ambient temperature results in an increased resistance. This in turn increases the self-heating, and the increased self-heating results in greater flow response by the sensing means. The effects of all of the factors involved can be utilized or controlled, and a highly dependable control device provided, by utilizing the concept of the present invention.

In accordance with the present invention, there is provided a flow sensing means having a defined flow path including at least two resistors affected by a fluid flow in said path, including: first bridge means having two branches connected to a source of variable potential; said first bridge means having output means intermediate said branches; a first resistor of said two resistors affected by said fluid flow connected in a first of said branches; said first resistor acting as a heater resistor for said sensing means; a temperature responsive resistor mounted in a heat exchange relationship with said sensing means; said temperature responsive resistor connected in a second of said branches; error feedback means having input means connected to said output means of said first bridge means; said error feedback means having output means connected to said two parallel branches to provide said source of variable potential to in turn controllably energize said first bridge means; second bridge means having two branches with said two branches connected to said output means of said error feedback means; said second bridge means having a branch including said second of said two resistors with said second resistor being a temperature dependent resistor in said flow path; and said second bridge means having output means connected intermediate said branches of said second bridge means.

Also, in accordance with the present invention, there is provided a flow sensing means having a defined flow path including at least three resistors affected by a fluid flow in said path, including: first bridge means having two branches connected to a source of variable potential; said first bridge means having output means intermediate said branches; a first resistor of said three resistors affected by said fluid flow connected in a first of said branches; said first resistor acting as a heater resistor for said sensing means; a temperature responsive resistor mounted in a heat exchange relationship with said sensing means; said temperature responsive resistor connected in a second of said branches; error feedback having input means connected to said output means of said first bridge means; said error feedback means having output means connected to said two parallel branches to provide said source of variable potential to in turn controllably energize said first bridge means; second bridge means having two branches with said two branches connected to said output means of said error feedback means; said second bridge means branches each including one of said second and third of said three resistors with said second and third resistors being temperature dependent resistors with second and third resistors in said flow path on opposite sides of said heater resistor; and said second bridge means having output means connected intermediate said branches of said second bridge means.

DESCRIPTION OF THE PREFERRED EMBODIMENTS

Figure 1:
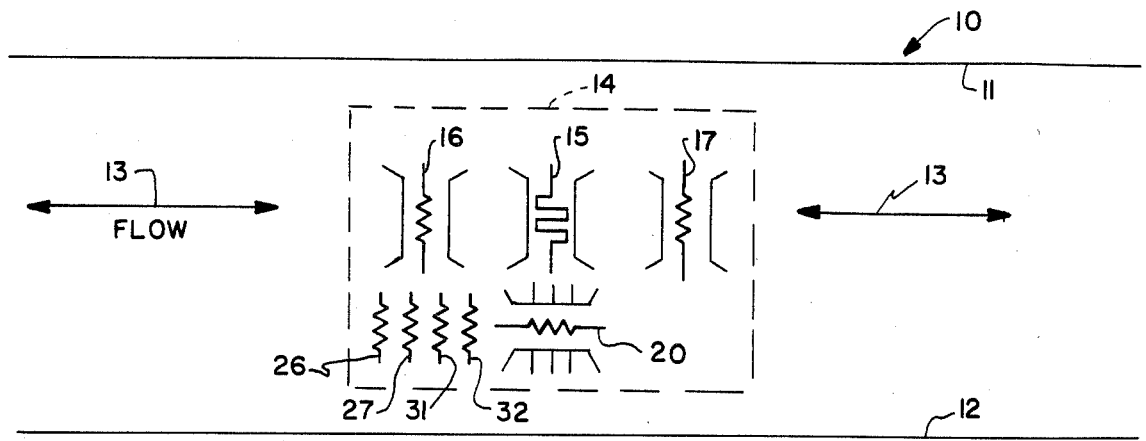
FIG. 1 is a representation of part of a flow sensing means.

In FIG. 1 a flow sensing means or pressure differential flow sensing means is generally disclosed at 10. The sensing means 10 includes a housing having walls 11 and 12 which define a fluid flow path 13 in which a fluid to be sensed is confined or directed. The device of FIG. 1 can be used as a flow sensing means, or as a device for differential pressure measurement. In either case it can be used in a bidirectional application.

Within the housing 11-12 there is placed a portion of the flow sensing means as indicated by the dashed rectangle 14. The portion 14 typically would be a surface that has been provided in a solid state type of unit, and upon which are placed a plurality of resistors. A resistor 15 is placed central to a pair of resistors 16 and 17. The resistors 15, 16, and 17 form three resistors that are affected by the fluid flow and are temperature sensitive. Each of the resistors is further disclosed schematically as constrained by a bracket merely to indicate a common area or environment in which these three resistors interact. This area typically would be a thin structure formed into the solid state unit in a manner known in the art, and therefore are thermally isolated from the solid state substrate. This symbol will make it easier to understand the interrelationship of the resistors 15, 16, and 17 when considered in connection with the circuit of FIG. 2. FIG. 1 is completed by the placement of a further resistor 20 that is a temperature dependent resistor or a temperature responsive resistor. Resistor 20 is mounted on and thermally coupled to the sensing portion 14, but not on the thin structure itself. The modified bracket symbol indicates the resistor is mounted upon the mass of the solid state unit. The exact placement of resistor 20 with respect to the resistor 15 is not intended to be represented by the drawing of FIG. 1.

Figure 2:
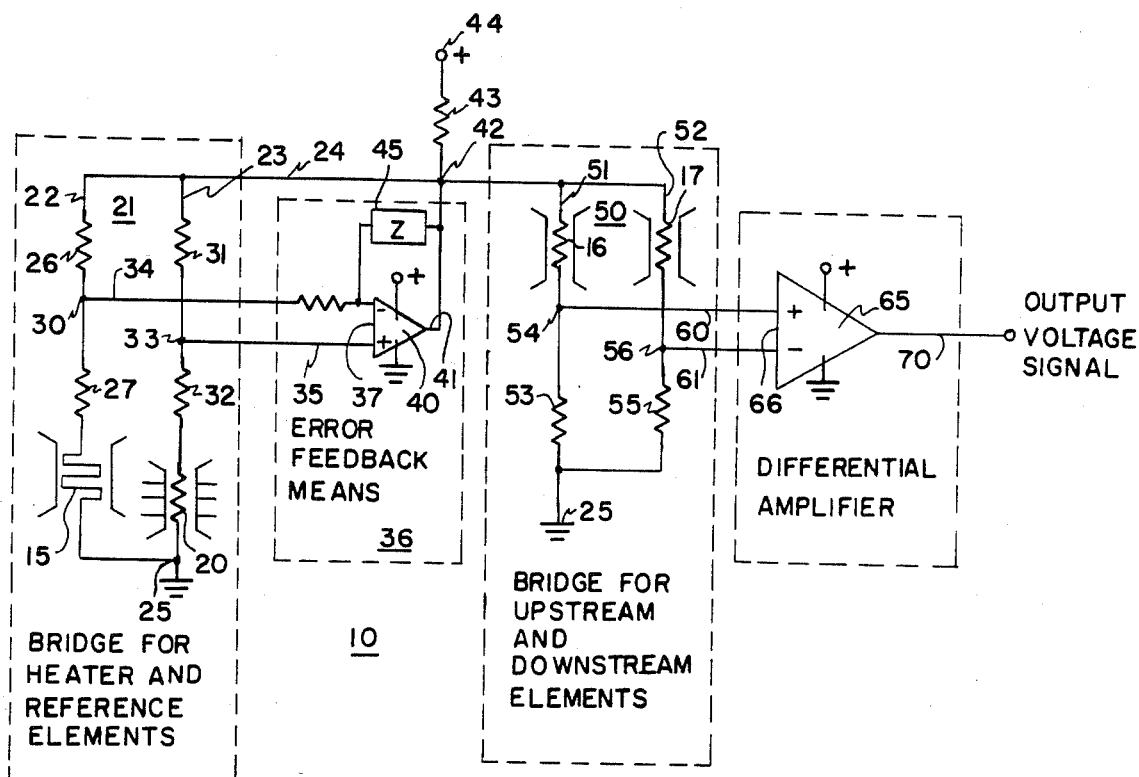
FIG. 2 is a circuit diagram of a compensated flow sensing device.

In FIG. 2 a circuit utilizing the structure of FIG. 1 is disclosed. In FIG. 2, a first bridge means is disclosed generally at 21 and includes a first branch 22 and a second branch 23. The branches 22 and 23 are connected to a common conductor 24 and a ground 25. The first bridge means 21 has in its first branch 22 a resistor 26 that is connected in series to a resistor 27 and the resistor 15. Branch 21 is connected to ground at 25. A node 30 exists between the resistors 26 and 27.

The second branch 23 of the bridge means 21 includes a series connection of resistors 31, 32, and the resistor 20 to ground 25. A node exists at 33 between the resistors 31 and 32. The nodes 30 and 33 provide the first bridge means 21 with output means via conductors 34 and 35 to an error feedback means generally disclosed at 36. The resistors 26, 27, 31, and 32 are fabricated of a material which has little or no variation in resistive value with changes in temperature. These four resistors are shown in FIG. 1 as placed upon the flow sensing means 14, with the temperature responsive resistor 20. These types of resistors are well-known, and the function will be described later in the present specification.

The error feedback means 36 has an input means 37 that is connected across the conductors 34 and 35 which are connected to the nodes 30 and 33. The error feedback means 36 is made up of an operational amplifier 40 that has an output conductor 41 that forms an output means between it and ground for the error feedback means 36. The output means 41 is connected at a junction 42 to the conductor 24. A resistor 43 connects conductor 24 to a source of potential 44. The resistor 43 and the potential 44 are used in the present device to insure initial operation of the sensing means 10, and are not needed after the operation has begun. They are shown merely for convenience. The error feedback means 36 is completed by a feedback impedance 45, shown as a general type impedance Z, that provides a negative feedback to stabilize the output of the operational amplifier 40 as a difference of potential is applied between the inverting and non-inverting inputs of the operational amplifier 40 from the nodes 30 and 33. The error feedback means 36 can be a form of integrator or can be an amplifier.

A second bridge means 50 is disclosed. The bridge means 50 has a first branch 51 and a second branch 52 connected in parallel from the conductor 24 to the ground 25. The first branch 51 includes the resistor 16 and an additional resistor 53, with a node 54 between them. The second branch 52 of the second bridge 50 includes the resistor 17 and a further resistor 55 with a node 56 between the resistors 17 and 55. A pair of output conductors 60 and 61 are connected to the nodes 54 and 56 and are in turn connected to a differential amplifier 65 that has the conductors 60 and 61 connected to its input at 66. The differential amplifier 65 has an output 70 that acts as an output for the flow sensing means 10.

In the second bridge means 50, the resistors 53 and 55 can be selected to control the total series resistance in the legs 51 and 52 of the bridge means 50 to establish the amount of self-heating of the resistors utilized. This effects the self-heating of the flow responsive resistors 16 and 17, and in turn effects the overall operation of the bridge means 50 so that it functions properly with bridge means 21.

In operation, the two Wheatstone bridges 21 and 50 are both provided with voltage from the error feedback means 36. The output voltage of the error feedback means 36 at conductor 41 varies as a function of the balance of the first bridge means 21. The error feedback means 36 keeps the first bridge means 21 balanced so that the voltages at the nodes 30 and 33 are equal. This is in turn accomplished by adjusting the voltage at 41. A change in ambient temperature affects the resistance of the resistor 20 and the voltage at node 33. The error feedback means 36 will react by driving the voltage at 41 or on conductor 24 to a new voltage, which adjusts the power dissipated, and therefore the temperature and resistance of the heater resistor 15. The new voltage at 41 will be such that the node voltages 30 and 33 become equal. The desired relationship between the ambient temperature and the heater temperature (which are at the resistors 20 and 15) is realized by proper selection of the resistors 26, 27, 31, and 32. All of the resistors 26, 27, 31 and 32 are temperature insensitive and their location can be physically on the same structure 14 of FIG. 1, or at a separate location. The present invention contains all critical resistance elements, that is the temperature sensitive and the temperature insensitive resistance elements, on a common solid state chip. This allows the heater resistor temperature to be dependent on the ambient temperature to compensate for temperature variations.

With the variation of voltage of the error feedback means, the first bridge means 21 is kept balanced. The voltage at 41 is also supplied to the second bridge means 50 which in effect changes the drive current of the second bridge means 50 so that the resistors 16 and 17 are properly controlled. Current is increased through these resistors as the ambient temperature is increased as is sensed by the resistor 20. The described temperature dependent drive of the second bridge means 50 helps compensate the entire flow sensing means 10 for ambient temperature changes. Also, as was previously described, the selection of the resistors 53 and 55 allow for the proper selection of the self-heating of the resistors 16 and 17.

While the present invention has been disclosed specifically as a pressure differential flow sensing device where flow can be sensed across the resistors 16 and 17 with respect to the heater 15. The present invention disclosure has suggested a number of variations of the configuration of the resistors within the two bridge means 21 and 50, and therefore would suggest numerous possible modifications to one skilled in the art. For that reason, the applicant wishes to be limited in the scope of his invention solely by the scope of the appended claims.

The embodiments of the invention in which an exclusive property or right is claimed are defined as follows:

1. A flow supporting means to sense fluid ambient temperature having a defined flow path including means supporting at least two resistors affected by a fluid flow in said path, including: first bridge means having two branches connected to a source of variable potential; said first bridge means having output means intermediate said branches; a first resistor of said two resistors affected by said fluid flow connected in a first of said branches; said first resistor acting as a heater resistor; a temperature responsive resistor mounted in a heat exchange relationship with said supporting means to sense fluid ambient temperature said temperature responsive resistor connected in a second of said branches; error feedback means having input means connected to said output means of said first bridge means; said error feedback means having output means connected to said two parallel branches to provide said source of variable potential to in turn controllably energize said first bridge means; second bridge means having two branches with said two branches connected to said output means of said error feedback means; said second bridge means having a branch including said second of said two resistors with said second resistor being a temperature dependent resistor in said flow path; and said second bridge means having output means connected intermediate said branches of said second bridge means.

2. A flow sensing means as described in claim 1 wherein said bridge means are Wheatstone bridges; said first of said bridges includes a plurality of resistors that are temperature insensitive.

3. A flow sensing means as described in claim 1 wherein said error feedback means is integrator means.

4. A flow sensing means as described in claim 1 wherein said error feedback means is amplifier means.

5. A flow sensing means as described in claim 2 wherein said error feedback means is an operational amplifier with said output means of said operational amplifier providing said source of variable potential.

6. A flow sensing means as described in claim 5 wherein said first resistor of said first branch of said first bridge being a self-heating resistor to generate heat that responds to ambient temperature changes as detected by said temperature responsive resistor of said first bridge.

7. A flow sensing means as described in claim 6 wherein said second bridge includes said second of said two resistors affected by fluid flow and which responds to said fluid flow by said second bridge balance being altered at its output means to in turn provide an output signal as a function of said fluid flow.

8. A flow sensing means as described in claim 7 wherein said second bridge include selected bridge resistors with said selected bridge resistors being selected to adjust the level of self-heating of said resistors that are affected by said fluid flow.

9. A flow sensing means as described in claim 8 wherein said flow resistors affected by fluid flow are mounted adjacent each other in a heat exchange relationship for said flow sensing means; and said flow sensing means being in a housing through which fluid flow is directed.

10. A flow sensing means as described in claim 9 wherein said first bridge resistors that are temperature insensitive are mounted upon a portion of said flow sensing means with said temperature responsive resistor.

11. A flow sensing means having a defined flow path including means supporting at least three resistors affected by a fluid flow in said path, including: first bridge means having two branches connected to a source of variable potential; said first bridge means having output means intermediate said branches; a first resistor of said three resistors affected by said fluid flow connected in a first of said branches; said first resistor acting as a heater resistor; a temperature responsive resistor mounted in a heat exchange relationship with said supporting means to sense fluid ambient temperature; said temperature responsive resistor connected in a second of said branches; error feedback means having input means connected to said output means of said first bridge means; said error feedback means having output means connected to said two parallel branches to provide said source of variable potential to in turn controllably energize said first bridge means; second bridge means having two branches with said two branches connected to said output means of said error feedback means; said second bridge means branches each including one of said second and third of said three resistors with said second and third resistors being temperature dependent resistors with second and third resistors in said flow path on opposite sides of said heater resistor; and said second bridge means having output means connected intermediate said branches of said second bridge means.

12. A flow sensing means as described in claim 11 wherein said bridge means are Wheatstone bridges; and said first of said bridges includes a plurality of resistors that are temperature insensitive.

13. A flow sensing means as described in claim 11 wherein said error feedback means is integrator means.

14. A flow sensing means as described in claim 11 wherein said error feedback means is amplifier means.

15. A flow sensing means as described in claim 12 wherein said error feedback means is an operational amplifier with said output means of said operational amplifier providing said source of variable potential.

16. A flow sensing means as described in claim 15 wherein said first resistor of said first branch of said first bridge being a self-heating resistor to generate heat that responds to ambient temperature changes are detected by said temperature responsive resistor of said first bridge.

17. A flow sensing means as described in claim 16 wherein said second bridge includes said second and third of said three resistors affected by fluid flow to respond to said fluid flow by said second bridge balance being altered at its output means to in turn provide an output signal as a function of said fluid flow rate and direction.

18. A flow sensing means as described in claim 17 wherein said second bridge includes selected bridge resistors with said selected bridge resistors being selected to adjust the level of self-heating of said resistors that are affected by said fluid flow.

19. A flow sensing means as described in claim 18 wherein said three resistors affected by fluid flow are mounted adjacent each other in a heat exchange relationship for said flow sensing means; and said flow sensing means being in a housing through which said fluid flow is directed.

20. A flow sensing means as described in claim 19 wherein said first bridge resistors that are temperature insensitive are mounted upon a portion of said flow sensing means with said temperature responsive resistor.

* * * * *

UNITED STATES PATENT AND TRADEMARK OFFICE
CERTIFICATE OF CORRECTION

PATENT NO. : 4,566,320

DATED : January 28, 1986

INVENTOR(S) : PHILIP J. BOHRER

It is certified that error appears in the above-identified patent and that said Letters Patent is hereby corrected as shown below:

Claim 9, line 13, cancel "flow" (first occurrence) and substitute --two--.

Signed and Sealed this

Twenty-second Day of April 1986

[SEAL]

Attest:

DONALD J. QUIGG

Attesting Officer

Commissioner of Patents and Trademarks